(12) United States Patent
Lassota et al.

(10) Patent No.: US 7,509,908 B1
(45) Date of Patent: Mar. 31, 2009

(54) BEVERAGE BREWER WITH SLIDING TUBE BREW VALVE ASSEMBLY

(75) Inventors: Zbigniew G. Lassota, Long Grove, IL (US); Michael W. Lassota, Wauconda, IL (US)

(73) Assignee: Food Equipment Technologies Company, Inc., Lake Zurich, IL (US)

( * ) Notice: Subject to any disclaimer, the term of this patent is extended or adjusted under 35 U.S.C. 154(b) by 748 days.

(21) Appl. No.: 11/096,533

(22) Filed: Apr. 1, 2005

Related U.S. Application Data

(60) Provisional application No. 60/559,320, filed on Apr. 2, 2004.

(51) Int. Cl.
*A47J 31/46* (2006.01)
(52) U.S. Cl. .......................................... 99/305; 99/280
(58) Field of Classification Search ........................ None
See application file for complete search history.

(56) References Cited

U.S. PATENT DOCUMENTS 1,323,234 A * 11/1919 Faber ........................... 222/44
3,423,209 A * 1/1969 Weber ........................... 99/299
4,819,553 A * 4/1989 Heyn et al. ..................... 99/305
5,000,082 A * 3/1991 Lassota ......................... 99/304
6,672,200 B2 * 1/2004 Duffy et al. .................... 99/305
6,843,165 B2 * 1/2005 Stoner ........................... 99/295

* cited by examiner

*Primary Examiner*—Joseph M Pelham
(74) *Attorney, Agent, or Firm*—James W. Potthast; Potthast & Associates

(57) ABSTRACT

A hot beverage brewer (20) with an L-shaped, segmented, hot water tank (36) having a laterally extending side body (50) to which is mounted a membrane mounted tubular brew valve (38) with a dispense tube (66) and an electromagnet (92,94) selectively energized by a micro-computer controller (28) to attract in successive stages a first stage energy plate (98) and a second stage energy plate (102) attached to the dispense tube (66) to move the tube from a closed position (FIGS. 2 and 3) in which an inlet (72) of the tube is above a preselected level (42) of water in the tank (36) to an open position (FIGS. 4 and 5) in which the inlet (72) is beneath the surface to pass hot water to a spray head (76). In one embodiment, one or more of the energy plates are permanent magnets (138,140) and in other embodiments the plates (98,102) are not permanent magnets and are resistive to being permanently magnetized.

19 Claims, 6 Drawing Sheets

BEVERAGE BREWER WITH SLIDING TUBE BREW VALVE ASSEMBLY

CROSS-REFERENCE TO RELATED APPLICATION

This application claims under 35 USC 119(e) the benefit of U.S. Provisional application No. 60/559,320 filed Apr. 2, 2004.

BACKGROUND OF THE INVENTION

1. Field of the Invention

This invention relates to a beverage brewer and method of brewing and more particularly to a hot beverage brewer with a brew tubular brew valve and method of making a hot beverage using such a tubular brew valve.

2. Discussion of the Prior Art

In U.S. Pat. No. 5,000,082 issued Mar. 19, 1991, to Lassota for "Beverage Maker and Method of Making Beverage" a coffee brewer is disclosed in which a dispenser valve assembly is in the form of a tube assembly with an inlet opening that is selectively moved between an open position in which the inlet opening is beneath a preselected water level and a closed position in which the inlet opening is above the preselected water level. This is a large commercial brewer with gallons of coffee being brewed into large, insulated dispensing urns that have serving faucets and are generally removed from the brewer after being filled to enable another empty urn to take its place.

One significant advantage of the use of an open tube assembly for the dispense tube is that when the tube assembly is in the closed position, the tube assembly is drained and cleaned by the steam of any residual water to avoid the formation of mineral and lime deposits that change the effective diameter and thereby undesirably alter the flow rate through the dispense tube assembly. Such lime deposits when formed in a conventional sliding door solenoid controlled valve can also interfere with closing of the valve. For these reasons, it is advantageous to use a dispense tube assembly instead of a conventional solenoid controlled valve that closes off the water tank.

The dispense tube assembly is mounted at an angle to the side of the water tank, and the water is conveyed laterally and downwardly by the tube assembly to an outlet end. The outlet end feeds a laterally displaced brew head that is fixedly mounted at a location spaced laterally from the side of the water tank. It has been determined by the inventors that it is important to make sure that the inlet end, when raised to the closed position, is substantially above the preselected water level in the tank to make sure that no water enters the inlet end due to splashing or the like. Similarly, it has been determined that it is important to make sure that the inlet tube is substantially beneath the preselected surface level of the water to make sure that it is in fact beneath the actual surface of the water and to reduce turbulence that would occur if the inlet end is at the surface level or only slightly beneath the surface. Disadvantageously, because of the angular movement of the tube assembly a greater amount of travel of the tube is needed to achieve a given amount of change in vertical position relative to the preselected level of the water in the tank than would be required if the movement were in a vertical direction perpendicular to the preselected surface level.

The raising and lowering of the inlet opening of the tube is achieved by sliding movement of an inlet tube within a stationary outlet tube fixedly located outlet end located outside of the water tank and above the brew basket. A coil spring connected to a spring retainer biases the movable tube toward the open position with the effective length of the tube assembly fully extended to maximum length. An electromechanical drive apparatus such as a solenoid, motor or other electronic apparatus is described as being also externally mechanically linked to the spring retainer and used to move the movably mounted portion of the tube assembly to the open position against resistance by the coil spring. In the only operation described in the patent, once the tube assembly is opened for dispensing hot water into the brew basket it remains open for the entire dispense period and thus there was no excessive operation of the drive apparatus during a given brew cycle. The drive apparatus is energized only once at the start of the dispense period and then de-energized at the end of the dispense period. Thus, there is little concern about the mechanical drive being used to move the dispense tube between the open and closed positions.

In U.S. Pat. No. 6,148,717 issued Nov. 21, 2000, to Lassota for "Beverage Maker with Intermittent Beverage Liquid Dispenser and Apparatus and Method for Uniform Contact of Brew Ingredient with Brew", a hot beverage maker is disclosed in which a conventional, non-tubular, solenoid controlled valve is used to dispense hot water from a hot water tank to the brew basket. As taught in that patent, there are advantages to providing the hot water to the brew basket on an intermittent basis throughout the dispense period rather than continuously during the dispense period. While use of a conventional solenoid-controlled valve enables successful operation it does not provide the advantages of a tubular dispense valve as discussed above and shown in the above U.S. Pat. No. 5,000,082. While the tubular dispense assembly is well adapted for use in a system in which the valve remains open throughout the dispense period, there are some disadvantages of wear and configuration awkwardness generally because of the side mounting, the sliding of one tube within another and the external mechanical drive linkage. The side mounting requires the spray head and the outlet of the tube to be spaced laterally from the water tank, and the use of two sliding tubes requires the use of seals that in time wear and may leak.

SUMMARY OF THE INVENTION

It is therefore the principal object of the present invention to provide a brewer and method of brewing that has the advantages of using a tubular dispense valve without the one or more of the disadvantages of the known tubular dispense valves described above.

It is also a object to provide a brewer and method of brewing with a powered dispense valve assembly that is well adapted for use with a brewer employing intermittent operation during the brew cycle, and more particularly, to such a brewer and method that is well adapted for use with a bottle brewer of the type in which the a relatively small amount of freshly brewed beverage is passed into a hand carried, glass serving decanter, or serving bottle.

More specifically, it is the object of the invention to provide such a brewer with a brew valve having a hollow dispense lube mounted for reciprocal movement within a water tank while attached to a flexible membrane to block flow of water out from water tank other than through the dispense tube.

It is also an object to provide such a brewer in which an electromagnet is employed to move the dispense tube by attracting or repelling a ferromagnetic or permanent magnetic material carried by the dispense tube.

A further object is to provide such a brewer with a segment, L-shaped water tank to enable vertical mounting and movement of the dispense tube.

More particularly, the object is achieved in part by provision of a beverage brewer with a base for supporting a brewer housing, a hot water tank within the housing for holding hot water to be used to make a beverage, said hot water container having a body with a bottom supported over the base and having a dispense opening, and a brew valve assembly mounted to the bottom of the hot water container having an elongate tubular member with an hollow body received through the dispense opening and extending between an open inlet opening located within the hot water tank and an open outlet opening located beneath the bottom of the hot water tank, a guide for mounting the elongate tubular member for movement between a closed position in which the open inlet opening is located above a preselected water surface level of the hot water container, and an open position in which the open inlet opening is beneath the preselected water surface level, a water impervious, flexible membrane, within the hot water tank, said membrane having an outer portion attached to the hot water tank and surrounding the dispense opening in water tight relationship, and an inner portion attached to and surrounding the tubular member in water tight relationship, and an electromagnetic device for selectively moving the tubular member between the open position and the closed position.

In a preferred embodiment the electromagnetic device includes an electromagnet and a fixed magnetic member made of at least one of (a) a ferromagnetic material, and (b) a fixed magnetic material, and means for mounting the fixed magnetic member to the body of the tubular member at a location between the bottom of the hot water tank and the membrane. Preferably, energization of the electromagnet creates an magnetic force that attracts the fixed magnetic member to move the tubular member to the open position.

Also, a spring is provided for biasing the tubular member toward the open position. The force of the biasing spring is less than the magnetic force attracting the fixed magnetic member when the electromagnetic device is energized but is sufficient to move the tubular member to the closed position when the electromagnetic device is not energized.

A spray head assembly includes mean for releasably mounting a spray head to a bottom end of the guide in water tight relationship for receipt of hot water from the outlet end of the tubular member.

The objective of the invention is also obtained by providing a beverage brewer having a water tank, a brew basket for holding ingredient through which water from the tank is passed, a dispense system with an elongate, dispense tube having a hollow tubular body extending between an open inlet end and an open outlet end, means for mounting the dispense tube for reciprocal movement with the inlet end within the water tank and the outlet end outside of the water tank, and means for reciprocally moving the tubular body between a relatively elevated closed position and relatively lower open position, both the inlet end and the outlet end being moved in unison with movement of the tubular body.

The object of the invention is also acquired partly by providing a beverage brewer for brewing a beverage by passing water through a beverage ingredient, the improvement being a dispense system with a segmented water tank having a main body and a relatively smaller dispense body in fluid communication with the main body, said dispense body being connected to and laterally extending from the main body, an elongate dispense tube assembly having a hollow tubular body interconnecting an open inlet end and an open outlet end, and means for movably mounting the tubular body to the dispense body for movement of the inlet end within the dispense body between a relatively elevated closed position and a relatively lower open position.

BRIEF DESCRIPTION OF THE DRAWINGS

The foregoing objects and advantageous features of the invention will be described in further detail and other advantageous features will be made apparent from the following detailed description of the preferred embodiment that is given with reference to the several figures of the drawing, in which.

DETAILED DESCRIPTION

Figure 1:
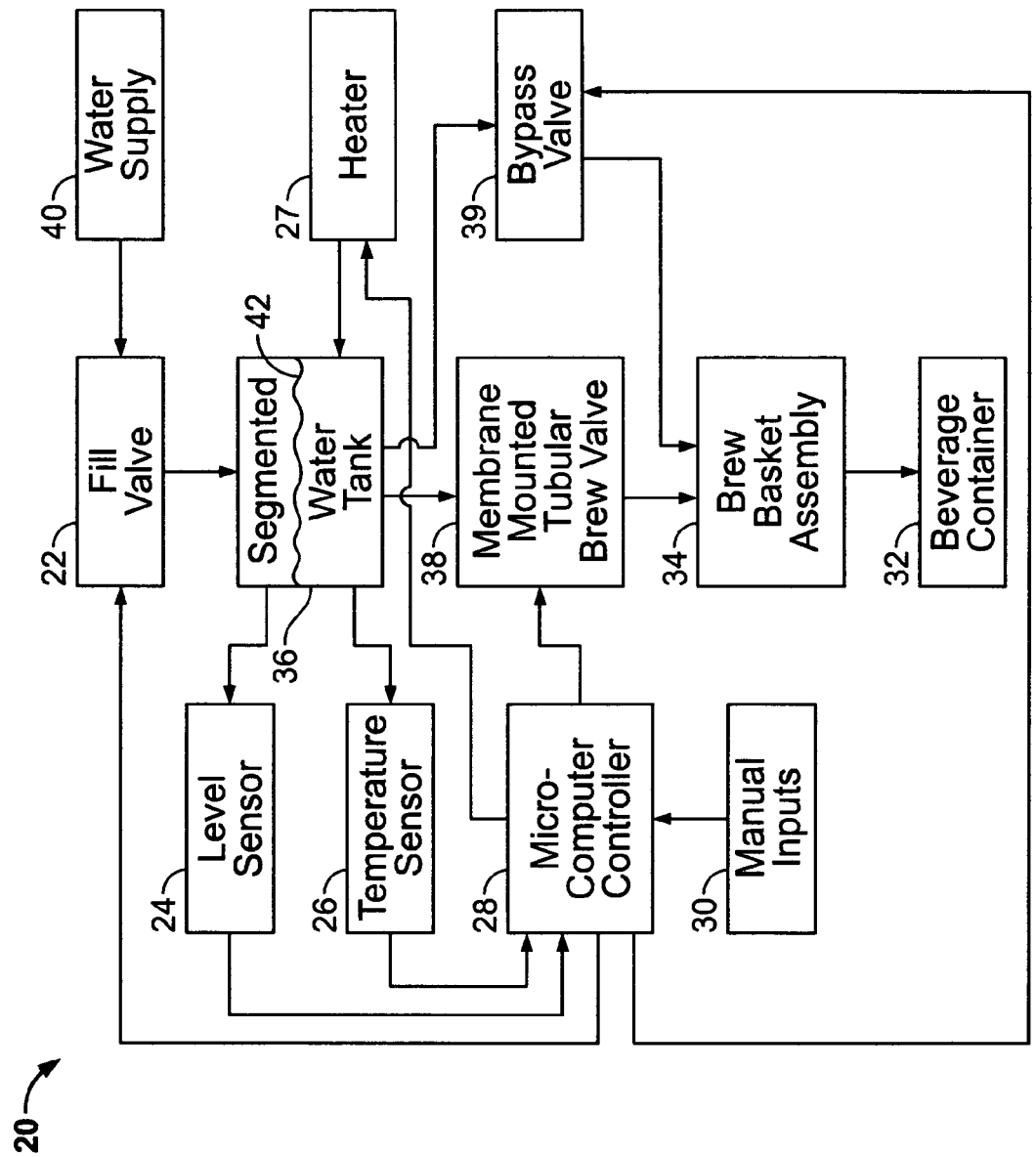
FIG. 1 is a functional block diagram of the preferred embodiment of the present invention.
Figure 2:
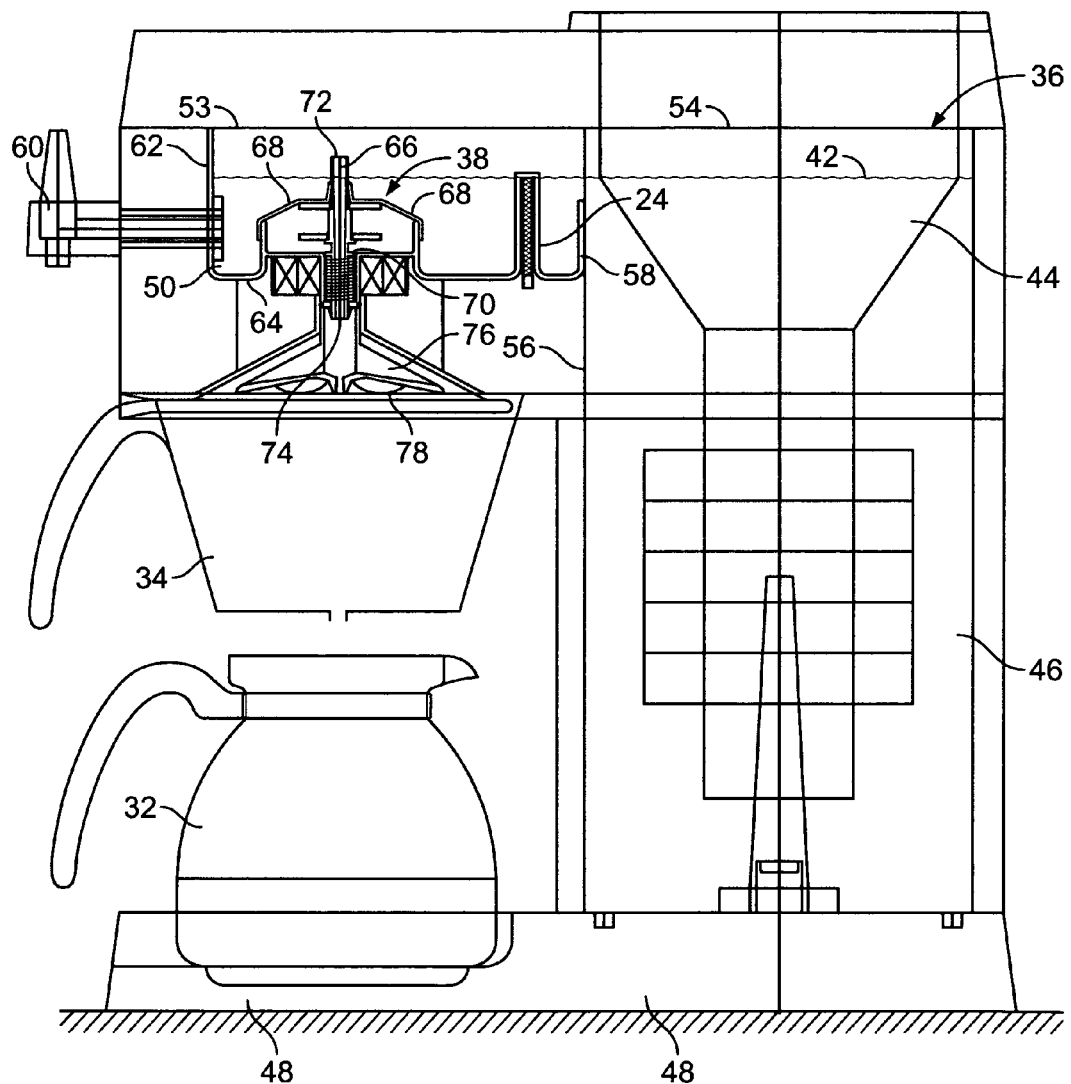
FIG. 2 is a sectional side view of the brewer of FIG. 1.
Figure 4:
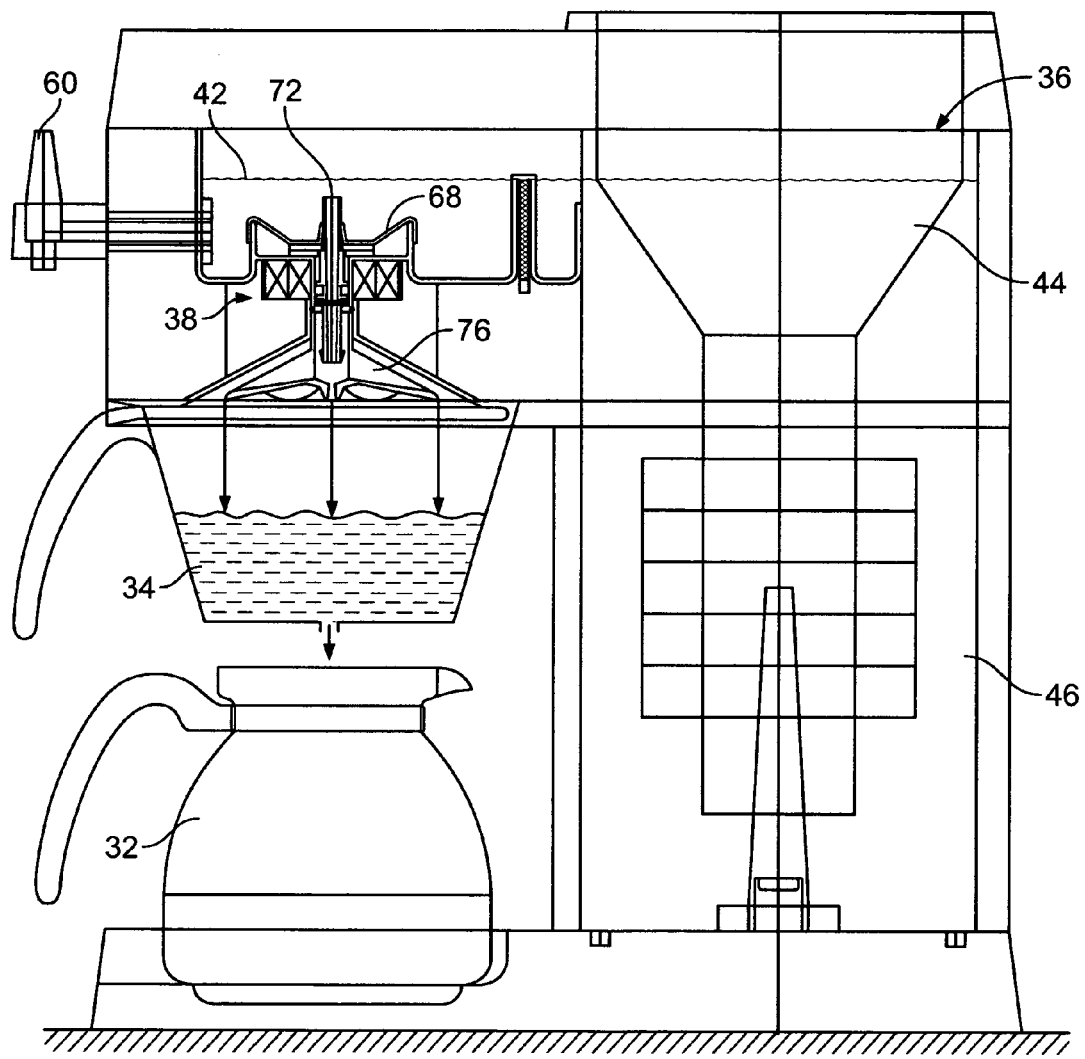
FIG. 4 is a sectional side view the brewer that is similar to that of FIG. 2 except showing the tubular brew valve in an open position.

Referring to FIG. 1, the preferred embodiment of the brewer 20 is provided with both conventional elements as well as those that are unique to the present invention and cooperate with the conventional elements to achieve the desirable features of the invention. The conventional elements include a fill valve 22, a level sensor 24, a temperature sensor 26, a heater 27 a microcomputer controller 28, manual inputs 30 to the controller 28, a beverage container 32 and a brew basket assembly 34. The novel elements of the brewer 20 are a segmented water tank 36 that has a generally L-shaped configuration, as best seen in FIGS. 2 and 4, and a membrane mounted tubular brew valve 38. In addition, a bypass valve 39 may be a conventional valve, or may constitute another valve constructed in accordance with present invention with a construction substantially the same as that of the membrane mounted tubular brew valve 38. The brewer 20 is used in conjunction with a water supply 40, such as provided by a public water supply utility, but the water supply 40 is not part of the brewer 20. Alternatively, the water is poured into the tank in the absence of a connection to a pressurized source of water.

The microcomputer controller 28 responds to signals from the level sensor 24 to control the solenoid controlled fill valve to maintain the level of the water in the segmented water tank at a preselected surface level 42 and responds to the temperature sensor 26 to control energization of the heater to maintain the water in the tank 36 within a preselected elevated temperature for brewing a beverage. The controller 28 responds to manual inputs and internal programming and preset parameters and menus to control the membrane mounted tubular brew valve to pass hot water from the water tank 36 to the brew basket assembly 34. Contained within the brew basket assembly is dry beverage ingredient such as ground coffee or tea, or other ingredient, wet or dry, which will mix at least in part with hot water to form the beverage, such as freshly brewed coffee or tea, or in the case of a fresh iced tea brewer to form a concentrated tea extract that is mixed with cold water from another tank (not shown) to make ice tea. The beverage that is formed passes through a drain hole at the bottom of the brew basket assembly 34 and into a beverage container 32. The membrane mounted tubular brew valve 38 is particularly well adapted for intermittent operation, and in accordance with the present invention, the controller 28 operates the brew valve 38 intermittently during a dispense period of the brew cycle in a manner specified in U.S. Pat. No. 6,148,717 issued Nov. 21, 2000 to Lassota for "Beverage Maker with Intermittent Beverage Liquid Dispenser and Apparatus and Method for Uniform Contact of Brew Ingredient with Brew", which is hereby incorporated by reference. Generally, for a more detailed discussion of the conventional elements of the brewer 20, reference may be made to U.S. Pat. No. 6,148,717 or to U.S. Pat. No. 5,000,082 issued Mar. 19, 1991 to Lassota for "Beverage Maker and Method of Making Beverage", which are also hereby incorporated by reference.

Referring now to FIGS. 2 and 3 and FIGS. 4 and 5, the construction of the membrane mounted tubular brew valve 38 is shown in detail together with a structural embodiment of the brewer 20 shown only in functional block form in FIG. 1. The segmented water tank 36 is seen to have a main body 44 supported over a leg assembly 46 that, in turn, is supported by a base 48. A laterally extending side body 50 is cantilever mounted to a front side 52 of the main body 44 and extends forwardly over the base 48 to provide the segmented tank 36 a generally L-shaped configuration. The side body 50 is in fluid communication with the main body at a level beneath the preselected level 42 and has a top 53 that is even with a top 54. The tops 53 and 54 are located above the preselected water level 42. The side body 50 is secured to a side 56 of the main body 44 by a mounting bracket 58 or both are integrally formed together from suitable plastic or other material approved for food preparation. A hot water faucet 60 is mounted to a front surface 62 of the side body 50 at a level beneath the preselected level 42 to dispense hot water from the side body.

The brew valve 38 is mounted to the bottom surface 64 of the side body 50 of the tank. The brew valve 38 principally includes a dispense tube 66 open at both ends that is attached in water tight relationship to an outwardly surrounding flexible membrane 68 and mounted for vertical reciprocal movement within a mounting hole 70 in the bottom surface 64 of the side body 50. The level sensor 24 is also mounted to the bottom surface 64 within the tank 36. The flexible, resilient membrane is sealed to the tube 66 and the top of bottom surface 64 of the side body 50 to seal closed the mounting hole 70 against water passage from the tank except for passage through the dispense tube 66.

Figure 3:
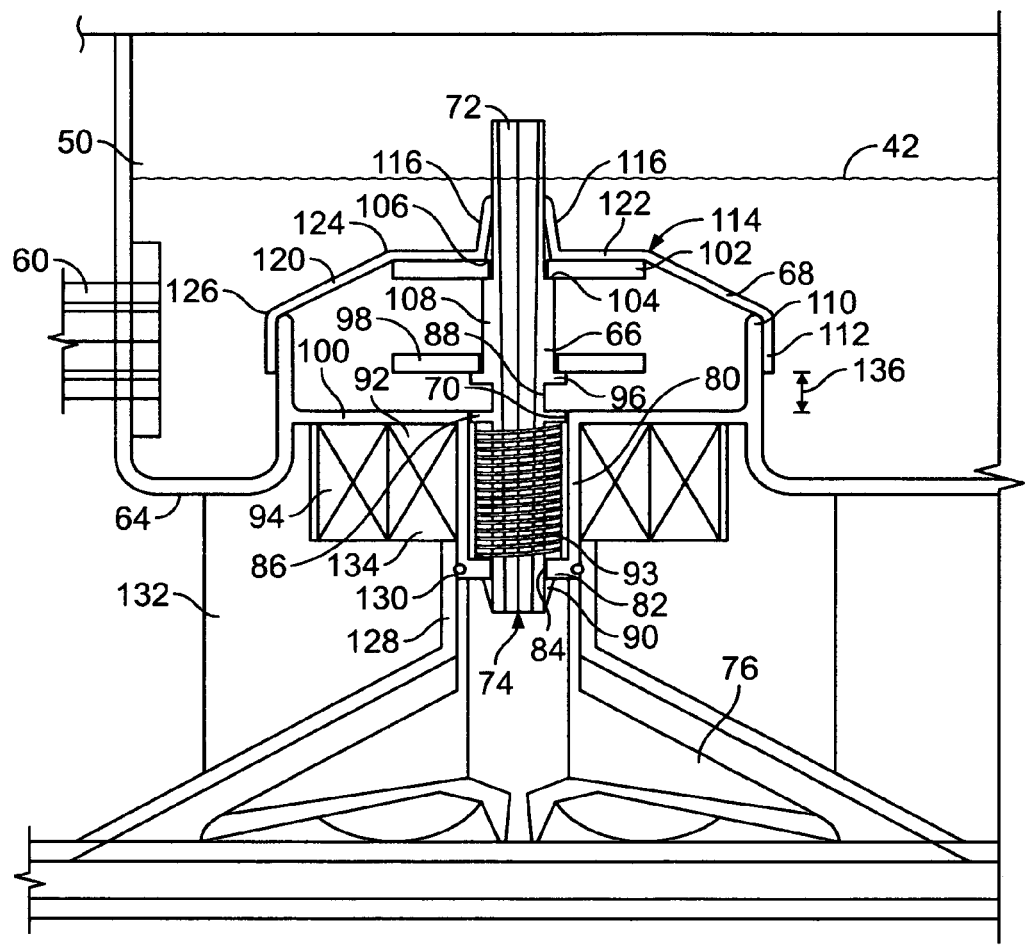
FIG. 3 is an enlarged sectional side view of a portion of the brewer of FIG. 2 to better show the tubular brew valve assembly when in the closed position.

FIGS. 2 and 3 show the brew valve 38 in the closed, or off, position in which an inlet end 72 of the dispense tube 66 is positioned above the preselected water level 42 to block the passage of hot water into the inlet end 72 and through the tube. FIGS. 3 and 4 show the brew valve 38 in the open, or on, position in which the inlet end 72 is located beneath the preselected surface level 42 at which the surface of the water in the tank 36 is maintained. When the inlet end 72 is beneath the surface of the water in the tank 36, hot water enters the inlet end 72 and passes through the tube 66 to an outlet end 74 and into a conical spray head assembly 76. The hot water that enters the spray head assembly 76 passes through a plurality of uniformly spaced spray holes (not shown) in a bottom surface 78 of the spray head assembly 76 to fall upon the coffee grounds, tea or other ingredient held within the removable brew basket 34 beneath the spray head assembly 76.

Referring to FIG. 3, in particular, it is seen that the portion of the body of the dispense tube 66 adjacent the outlet end 74 passes through and is supported within an outer tubular guide having a generally cylindrical, elongate guide section 80 and an inwardly turned spring engagement collar 82 surrounding a centrally located, circular, inner, tube mounting hole 84. The inner, tube-mounting hole 84 is aligned with and located beneath the top opening of the elongate guide section 80 defining the mounting hole 70 shown in FIG. 2. When in the closed, or off, position as shown in FIG. 3, a spring retaining, guide-collar 86 that extends outwardly from a relatively narrower, generally cylindrical body 88 is snugly received within the open mounting hole 70 but with sufficient clearance to enable smooth sliding movement of the outward perimeter of the guide-collar 86 within the cylindrical, interior surface of the cylindrical guide section 80. The lower end of the cylindrical body 88 of the dispense tube is likewise snugly received within the inner, tube-mounting hole 84. A conical retainer section 90 at the outlet end of the dispense tube 66 defines an upwardly facing shoulder that abuts against the bottom surface of the spring engagement collar 82 to block movement of the of the dispense tube 66 to a position higher that that shown in FIG. 3.

A coil spring 93 is wrapped around the cylindrical body 88 of the dispense tube 66 and is contained between the spring retaining, guide collar 86 and the inwardly turned spring engagement collar 82. This spring is uncompressed when the brew valve 38 is in the position shown in FIGS. 2 and 3, but becomes compressed when the dispense tube 66 is moved to the open position shown in FIGS. 4 and 5, and then functions to bias the dispense tube to move to the closed position, as shown in FIGS. 2 and 3.

The elongate, cylindrical guide section 80 is externally surrounded by an annular magnetic core 92, preferably made of ferromagnetic material such as steel or a composite with ferromagnetic material that is relatively impervious to heat as higher than 212-degrees Fahrenheit and which will not readily become permanently magnetized. Preferably, such material as carbon alloy steel is used. The annular magnetic core 92, in turn, is externally surrounded by an annular, electromagnetic coil 94. The annular magnetic coil 94 is selectively energized under control of the controller 28 to magnetize the core 92 and thereby open the valve 34. When deenergized, the electromagnet formed by the core 92 and the coil loses its magnetic properties to thereby allow the coil spring 93 to close the valve 34.

Preferably, the body 88 of the dispense tube 66 carries a laterally, outwardly extending, annular, mounting and guide and support collar 96 that has substantially the same outer diameter as the guide collar 86 for sliding receipt within the elongate tubular section 80. The mounting and guide collar 86 also supports a ferromagnetic annular disc, or first stage energy plate, 98 when the collar 96 is located above the mounting opening 70. However, when the collar is slid through the mounting opening 70 and into the cylindrical bore of the elongate tubular section 80, the first stage energy plate 88 is blocked from further travel with the collar 96 and lifted off of the collar 96 by the an elevated central section 100 of the bottom 64 of the side body 50 of the tank 36 surrounding the opening 70. The portion of the cylindrical body 88 of the dispense tube 66 located above the collar 96 slides through the central opening of the annular energy plate 98. A second ferromagnetic, annular disc, or second stage energy plate, 102 is mounted to the dispense tube 66 in a relatively fixed position between a mounting shoulders 104 and a retainer 106 defining a mounting slot in a generally cylindrical, relatively wider section 108 of the dispense tube 66.

The elevated section 100 of the bottom 64 of the side body 50 of the tank is surrounded by an upwardly extending, continuous cylindrical wall 110. The top of the wall 110 is attached to a downwardly extending perimeter attachment wall 112 of a generally cup-shaped, flexible, resilient, water impervious membrane 114, preferably made of silicon elastomer that retains its elastic properties and water impervious properties at temperatures as higher than the boiling temperature of water. The connection of the wall 112 to the attachment wall 114 is continuous around both of the walls 110 and 112 and is watertight so that no water may pass into the spray head except through the dispense tube 66. The top of the cup-shaped membrane 114 has a central opening surrounded by an upwardly standing connection neck 116. A portion 118 of the tubular body 88 is received through the central opening and is fixedly attached to the upwardly standing connection neck 116. This connection is also continuous around the entire portion 118 and is watertight. A conical wall 120 is joined to an annular, generally horizontal wall 122 at a junction 124. The annular wall extends continuously between the connection neck 116 and the junction 124, and the conical wall extends continuously from the junction 124 and another junction 126 with the perimeter attachment wall 112. All of the elements of the cup-shaped membrane are preferably integrally molded from resilient material that maintains resiliency and strength despite elevated temperature and repeated flexing.

The spray head 76 has an upwardly standing neck 128 that is press fit around the lower end of the elongate section 80, and an O-ring 130 provides a water tight seal between the neck 128 and the elongate section 80. Radially extending, thin walled, vanes 132 are attached to the conical wall of the spray head 76 and extend upwardly to the bottom 64 of the side body 50 of the tank and also to the bottom of the core 92 and the coil 94 to provide additional structural support and stability for these elements.

Figure 5:
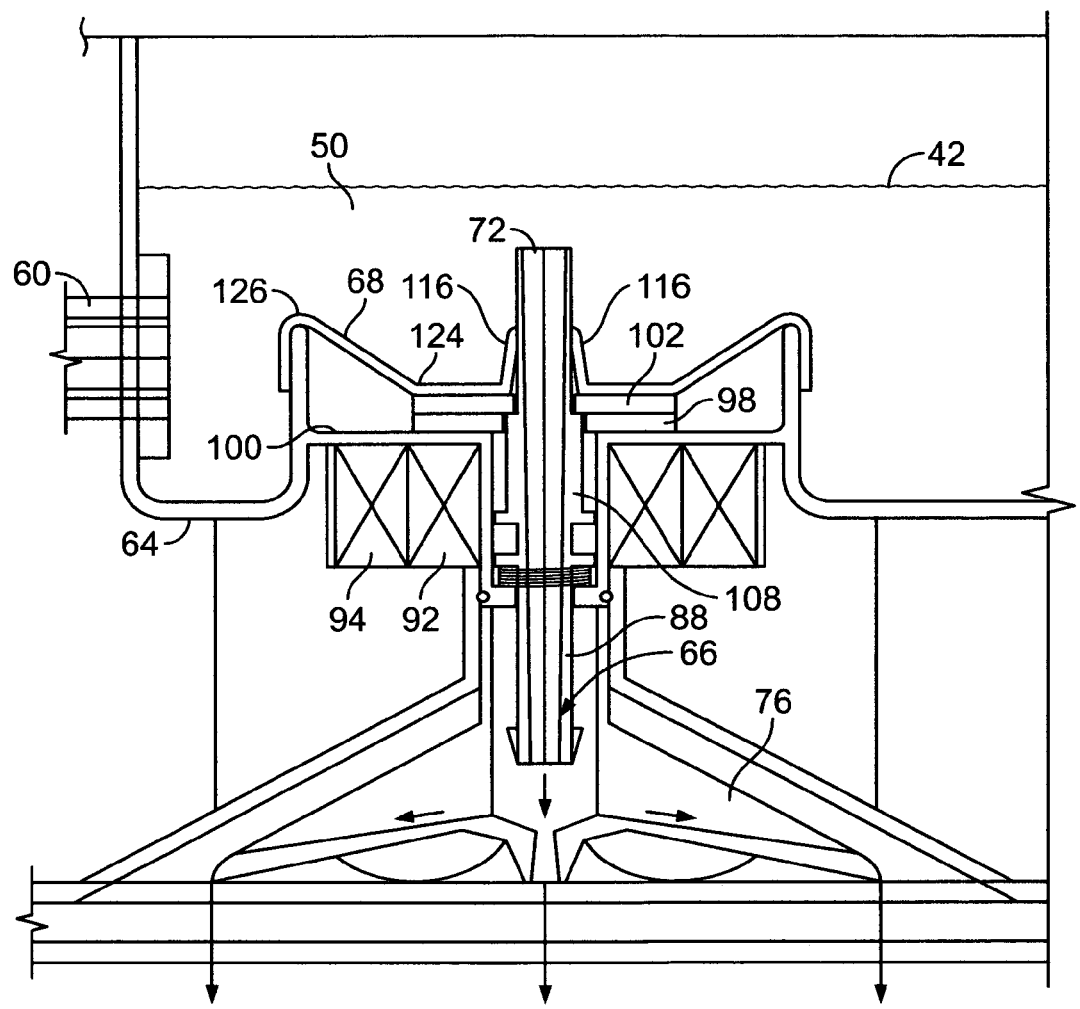
FIG. 5 is a sectional side view of an enlarged portion of the brewer of FIG. 4 to better shown the tubular brew valve assembly when in the open position.

Turning now to FIGS. 4 and 5, the core 92 and the coil 94 define an electromagnet. When the coil is energized a magnetic field is generated with a positive pole, or north pole, at the top of the core adjacent to the bottom surface 100 and a negative pole, or south pole, at bottom 134 of the core. This magnetic field attracts the first stage energy plate 98 that is closest to the top pole of the magnet and is of sufficient strength to overcome the spring bias of the coil spring 93 and the resiliency of the cup-shaped membrane 114 to move the first stage energy plate 98 to the bottom surface 100. The second stage energy plate 102 is out of range of the magnetic field within which the strength of the magnetic attraction is sufficient to overcome the force of the spring 93 when in the position shown in FIG. 3. However, because of the collar 96, the movement of the energy plate 98 to the bottom surface section 100 also moves the dispense tube 66 downwardly by the distance 136 separating the energy plate 98 and the bottom surface 100 when the valve 38 is in the closed position as shown in FIG. 3. This downward movement pulls the upper, second stage energy plate 102, by this same distance 136 closer to the top or north pole of the electromagnet plus an additional distance due to the momentum of the dispense tube 66 and the second energy plate 102 to a position in which the second stage energy plate is within range of the magnetic field within which the strength of the magnetic attraction is sufficient to overcome the force of the spring 93. When it becomes close enough to the magnetic field to be magnetically attracted by a sufficient amount of force to overcome the spring bias of the coil spring 92 and the resiliency of the resilient cup-shaped membrane 114 it continuous to move downwardly due to this magnetic force until it is pressed against the bottom surface section 100 adjacent the positive pole of the core 134. Because the second stage energy plate is fixedly attached to the body section 108 of the dispense tube 66, the dispense tube is moved downwardly with the second stage energy plate 102 until the inlet end is located at the open level beneath the preselected surface level as shown in FIGS. 4 and 5. The first energy plate is lifted off the collar 96 as the collar 96 passes through the opening 70 surrounded by the core 134 and rides up the body 108 of the dispense tube 66 until the bottom of the second energy disc 102 is resting on top of the first energy disc 98 which, in turn, is resting on top of the top surface 100. When this occurs, the inlet end of the tube is located beneath the preselected level 42, and the valve 38 is open. The two energy plates block further movement of the dispense tube beneath the open position, or over-travel.

While the use of two energy plates is preferred, it should be appreciated that the use of two energy plates enables a greater amount of travel of the dispense tube 66 than could be achieved if there were only the one fixed energy plate 102 for an electromagnet of given strength. While the same amount of travel may be obtained with use of only the single energy plate 102 if a larger, or stronger, electromagnet is used, and such an embodiment is contemplated by the invention, a smaller electromagnet is preferred both for purposes of size, cost and energy efficiency. The drawing scale of FIGS. 3 and 5 is approximately 1:1, and as shown, preferably, the inlet end 72 is at least 0.5 inch above the preselected level 42 when the valve is closed to reduce the inadvertent entry of water into the inlet due to splashing, overfill, tipping or the like and is at least 0.5 inch beneath the preselected level 42 when the valve is open to reduce turbulence at the point of entry and to ensure that the inlet 72 is in fact beneath the surface of the water in the tank despite the tank being possibly mounted out of plumb, or the brewer 20 being mounted on a tilted surface.

In the embodiment shown in FIGS. 2-5, the energy discs are preferably not permanent magnets and are resistant to becoming permanently magnetized despite being repeatedly in the presence of the magnetic field of the electromagnet. If the discs 102 and 98 became magnetized, then the disc 98 would become attached to the disc 102 by means of permanent magnetic force and would not return to the position resting on the collar 96 when the valve is returned to the closed position.

Figure 6:
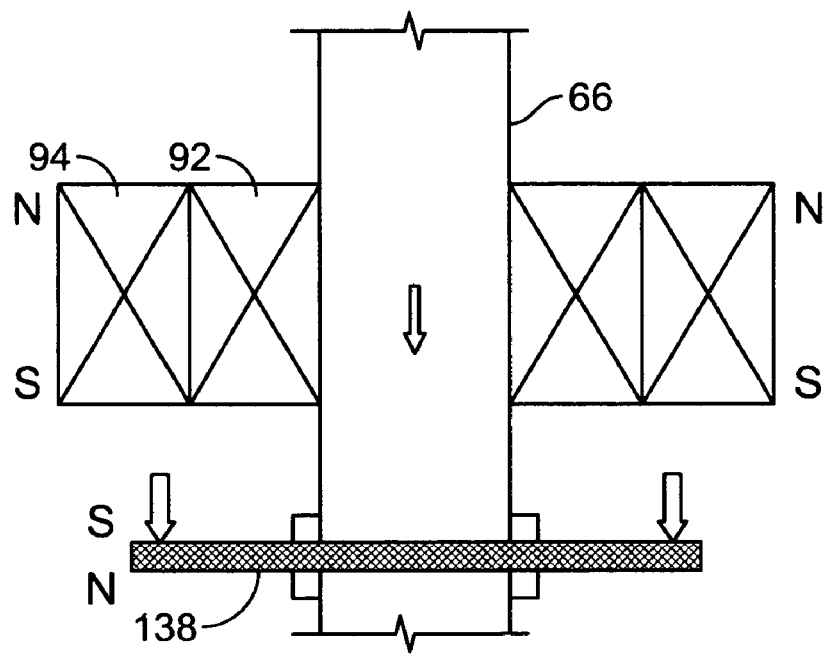
FIG. 6 is a schematic illustration of an alternative embodiment in which a permanent magnet is used with the brew valve.

Alternatively, permanent magnets may be used as one or more of the energy discs if the discs are prevented from adhering to each other. Referring to FIG. 6, in one alternative embodiment, the disc 98 or 102 is replaced by a permanent disc magnet 138 attached to the dispense tube 66 on a low side of the core 92 that is opposite from the high side on which is located the other one of the discs 98 or 102 (not shown in FIG. 6). In such case, the neck 128 of the spray head may have to be enlarged to accommodate the presence of the magnetic disc 138. If the first stage energy disc 98 is replaced a disc which is a permanent magnet, then the permanent magnetic polarity of the disc located closest to the core 92 should be the same as that of the polarity at the bottom of the core 92. Consequently, when the coil is energized, the like poles of the electromagnet and the permanent magnet 138 will repel each other, and the dispense tube 66 to which it is attached will be forced downwardly to move the fixed disc 102 within attractive range of the top of the electromagnet. Alternatively, the first stage disc 98 is not replaced but the permanent magnet may be used to bring the disc 98 within range of the top of the electromagnet to provide another stage of movement and to increase the maximum distance of dispense tube movement between the closed and open positions to act as an intensifier with or without the energy plate.

Figure 7:
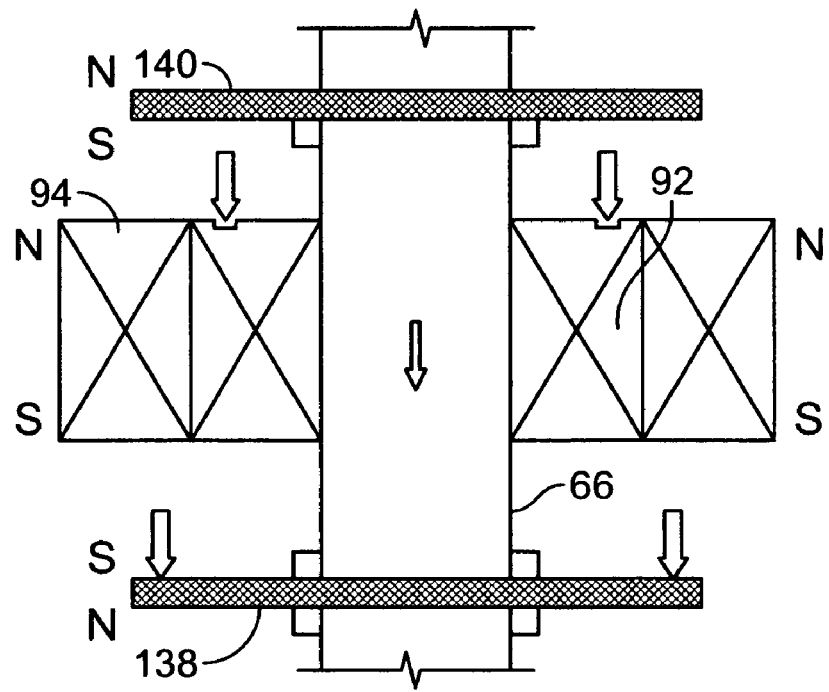
FIG. 7 is a schematic illustration of another alternative embodiment in which two permanent magnets are used with the brew valve.

Alternative to the construction shown in FIGS. 2-5, as shown in FIG. 7, in another embodiment, the first stage disc 98 may be replaced by the permanent magnet 138 at the bottom of the core 92 with the polarity alignment opposite that of the electromagnet to created a repulsive force to move the dispense tube 66 downwardly while the fixedly mounted disc 102 is replaced by a permanent disc magnet 140 that has its polarity aligned with that of the electromagnet to create an attractive force when the coil 94 is energized to again move the dispense tube 66 downwardly. In any event, when power is removed from the coil 94, the electromagnetic field collapses to allow the coil spring 93 and the resiliency of the cup-shaped membrane 114 to return the dispense tube to the closed position shown in FIGS. 2-3.

While particular embodiments have been shown to illustrate the invention, it should be appreciated that many variations may be made that will be obvious to a person skilled in the art of brew valve design and beverage brewers in general without departing from the spirit and scope of the invention as contemplated and inherently disclosed. For instance, while only two discs have been shown, as described, additional non-permanent magnet energy plates that are floating like the first stage energy disc to provide a second floating, intermediate, second stage energy disc to enable a greater amount of throw of the dispense tube. While a spring is used, it would also be possible to eliminate the spring and employ a flexible membrane that would be self-biasing. While the functions that the various parts perform are important the precise structure is not so long as the function is achieved as will be appreciated by those skilled in the art.

The invention claimed is:

1. In a beverage brewer comprising:
   a base for supporting a brewer housing;
   a hot water tank within the housing for holding hot water to be used to make a beverage, said hot water container having a body with a bottom supported over the base and having a dispense opening; and
   a brew valve assembly mounted to the bottom of the hot water container having
       an elongate tubular member with an hollow body received through the dispense opening and extending between an open inlet opening located within the hot water tank and an open outlet opening located beneath the bottom of the hot water tank,
       a guide for mounting the elongate tubular member for movement between
           closed position in which the open inlet opening is located above a preselected water surface level of the hot water container, and
           an open position in which the open inlet opening is beneath the preselected water surface level;
       a water impervious, flexible membrane, within the hot water tank, said membrane having
           an outer portion attached to the hot water tank and surrounding the dispense opening in water tight relationship, and
           an inner portion attached to and surrounding the tubular member in water tight relationship, and
       an electromagnetic device for selectively moving the tubular member between the open position and the closed position.

2. The beverage brewer of claim 1 in which the electromagnetic device includes an electromagnet.

3. The beverage brewer of claim 2 including
   a fixed magnetic member made of at least one of (a) a ferromagnetic material, and (b) a fixed magnetic material, and
   means for mounting the fixed magnetic member to the body of the tubular member at a location between die bottom of the hot water tank and the membrane.

4. The beverage brewer of claim 3 in which energization of the electromagnet creates a magnetic force that attracts the fixed magnetic member to move the tubular member to the open position.

5. The beverage brewer of claim 4 in which the tubular body has a laterally extending member to block movement of the tubular member beyond the open position.

6. The beverage brewer of claim 3 including a spring for biasing the tubular member toward the open position, the force of the biasing spring being less than the magnetic force attracting the fixed magnetic member when the electromagnetic device is energized but sufficient to move the tubular member to the closed position when the electromagnetic device is not energized.

7. The beverage brewer of claim 6 in which the spring is a coil spring surrounding the tubular member and being located within the guide and beneath the bottom of the hot water tank.

8. The beverage brewer of claim 7 in which the guide has an inwardly extending fixed collar and the tubular member has an outwardly extending collar and the coil spring is squeezed between the fixed collar and the outwardly extending collar.

9. The beverage brewer of claim 7 in which the electromagnet is annular and surrounds the guide.

10. The beverage brewer of claim 3 in which the tubular body carries a stop member relatively adjacent to the inlet to prevent movement of the tubular body beyond the open position.

11. The beverage brewer of claim 1 including a spray head, mean for releasably mounting the spray head to a bottom end of the guide in water tight relationship for receipt of hot water from the outlet end of the tubular member.

12. In a beverage brewer having a water tank, a brew basket for holding ingredient through which water from the tank is passed, a dispense system, comprising:
   a brew valve assembly with and open inlet within the tank, an open outlet without the tank, and an elongate, dispense tube having a hollow tubular body extending between and having opposite ends coinciding with the open inlet and an open outlet of the brew valve assembly;
   means for mounting the dispense tube for reciprocal longitudinal movement, said longitudinal movement causing both the inlet and the outlet of the brew valve assembly to move in unison said mounting means including a resilient, water impervious membrane with a central mounting hole through which the tubular body passes, and
   a peripheral portion secured to an edge of a dispense mounting hole in the water tank, said membrane providing a flexible, water tight seal between the tubular body and the edge of the dispense mounting hole; and
   means for reciprocally longitudinally moving the tubular body to move the both the inlet and the outlet of the brew valve assembly in unison between a relatively elevated closed position and relatively lower open position.

13. In a beverage brewer having a water tank, a brew basket for holding ingredient through which water from the tank is passed, a dispense system, comprising:
   an elongate, dispense tube having a hollow tubular body extending between an open inlet end and an open outlet end;

means for mounting the dispense tube for reciprocal movement with the inlet end within the water tank and the outlet end outside of the water tank; and means for reciprocally moving the tubular body between a relatively elevated closed position and relatively lower open position, both the inlet end and the outlet end being moved in unison with movement of the tubular body, the mounting means including a resilient, water impervious membrane with a central mounting hole through which the tubular body passes, and a peripheral portion secured to an edge of a dispense mounting hole in the water tank, said membrane providing a flexible, water tight seal between the tubular body and the edge of the dispense mounting hole.

14. The beverage brewer of claim 13 in which the reciprocally moving means includes an electrical solenoid coil surrounding the tubular body for selectively applying an electromagnetic force to the tubular body to move the tubular body to one of the open position and the close position.

15. The beverage brewer of claim 13 in which the resilient membrane resiliently biases the tubular body toward the closed position when the tubular body is moved away from the closed position, and resiliently holds the tubular body in the closed position except when the electromagnetic force moves the tubular body to the closed position.

16. The beverage brewer of claim 13 in which the resilient membrane is attached to the tubular body and moves with movement of the tubular body.

17. In a beverage brewer for brewing a beverage by passing water through a beverage ingredient, the improvement being a dispense system, comprising:

a segmented water tank having a main body and a relatively smaller dispense body in continuous fluid communication with the main body, said dispense body being connected to and laterally extending from the main body;

a dispense tube assembly having an open inlet, an open outlet, and a hollow elongate tubular body interconnecting the open inlet and the open outlet;

means for movably mounting the tubular body to the dispense body for longitudinal movement of the tubular body to move the open inlet end within the dispense body between a relatively elevated closed position; and the dispense body has a bottom and the elongate dispense tube is movably mounted to the bottom and a relatively lower open position and for longitudinal movement of the open outlet of the dispense.

18. The beverage brewer of claim 17 in which the movably mounting means includes an electromagnetic assembly.

19. The beverage brewer of claim 18 in which tile electromagnetic assembly includes one of (a) a ferromagnetic member and (b) a permanent magnetic member, on the one hand, and (c) an electromagnet to selectively provide a magnetic force acting on the fixed non-electromagnetic member.

* * * * *